United States Patent
Zhu

(10) Patent No.: US 12,493,981 B2
(45) Date of Patent: Dec. 9, 2025

(54) CABLE DETECTION METHOD, ROBOT AND STORAGE DEVICE

(71) Applicants: SHANGHAI FLEXIV ROBOTICS TECHNOLOGY CO., LTD., Shanghai (CN); FLEXIV LTD., Cayman Islands (GB)

(72) Inventor: Guangfei Zhu, Shanghai (CN)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 455 days.

(21) Appl. No.: 17/925,414

(22) PCT Filed: May 13, 2021

(86) PCT No.: PCT/CN2021/093593
§ 371 (c)(1),
(2) Date: Nov. 15, 2022

(87) PCT Pub. No.: WO2021/228194
PCT Pub. Date: Nov. 18, 2021

(65) Prior Publication Data
US 2023/0186514 A1    Jun. 15, 2023

(30) Foreign Application Priority Data

May 15, 2020  (CN) .......................... 202010413466.X
May 11, 2021  (CN) .......................... 202110514942.1

(51) Int. Cl.
G06T 7/73    (2017.01)
G06T 7/11    (2017.01)
G06T 7/50    (2017.01)
G06V 10/74   (2022.01)
G06V 20/50   (2022.01)

(52) U.S. Cl.
CPC .................. G06T 7/74 (2017.01); G06T 7/11 (2017.01); G06T 7/50 (2017.01); G06V 10/761 (2022.01);
(Continued)

(58) Field of Classification Search
CPC .... G06T 7/74; G06T 7/50; G06T 7/00; G06T 7/90; G06T 7/11; G06T 7/194;
(Continued)

(56) References Cited

U.S. PATENT DOCUMENTS 8,265,425 B2 *   9/2012  Ng-Thow-Hing ...... G06T 7/536
                                                      382/199
2015/0003725 A1 *   1/2015  Wan ........................... G06T 7/11
                                                      382/154
(Continued)

FOREIGN PATENT DOCUMENTS

CN    108345867 A    7/2018
CN    108648233 A    10/2018
(Continued)

OTHER PUBLICATIONS

Y. Li, "Object Detection and Instance Segmentation of Cables (Dissertation)". (2019). Retrieved from https://urn.kb.se/resolve?urn=urn:nbn:se:kth:diva-271203 (Year: 2019).*

(Continued)

Primary Examiner — Sumati Lefkowitz
Assistant Examiner — Anna Lei
(74) Attorney, Agent, or Firm — Dority & Manning, PA

(57) ABSTRACT

The present application relates to a cable detection method, a robot and a storage device. The method includes: acquiring an RGB image of a cable and a corresponding depth image; performing image segmentation on the RGB image, and merging pixel points in the RGB image, which are adjacent in position and have similar pixel features, into super-pixels;

(Continued)

determining a target similarity between at least some of the super-pixels and the adjacent super-pixels, and detecting cables in the RGB image according to the target similarity between at least some of the super-pixels and the adjacent super-pixels; determining whether the cables are overlapped; and when it is detected that the cables are overlapped, determining an overlapping relationship between the detected cables according to the depth image.

20 Claims, 5 Drawing Sheets

(52) U.S. Cl.
CPC .... *G06V 20/50* (2022.01); *G06T 2207/10024* (2013.01); *G06T 2207/10028* (2013.01); *G06T 2207/30242* (2013.01)

(58) Field of Classification Search
CPC . G06T 2207/30242; G06T 2207/30108; G06T 2207/10024; G06T 2207/10028; G06V 10/761; G06V 10/422; G06V 10/457; G06V 20/50; G06V 2201/06; G06V 20/60
See application file for complete search history.

(56) References Cited

U.S. PATENT DOCUMENTS

| | | | |
|---|---|---|---|
| 2016/0275695 A1* | 9/2016 | Luczak | G06V 20/52 |
| 2020/0162714 A1* | 5/2020 | Kwak | G06T 3/18 |

FOREIGN PATENT DOCUMENTS

| | | |
|---|---|---|
| CN | 108985247 A | 12/2018 |
| CN | 109541401 A | 3/2019 |
| CN | 109584281 A | 4/2019 |
| CN | 110097542 A | 8/2019 |
| CN | 110135269 A | 8/2019 |
| CN | 110610505 A | 12/2019 |
| CN | 110617772 A | 12/2019 |
| CN | 111127548 A | 5/2020 |
| CN | 111639620 A | 9/2020 |
| CN | 111667463 A | 9/2020 |
| CN | 112347882 A | 2/2021 |

OTHER PUBLICATIONS

K. Cameron and M. S. Islam, "Multiple Objects Detection using HSV," NAECON 2018—IEEE National Aerospace and Electronics Conference, Dayton, OH, USA, 2018, pp. 270-273, doi: 10.1109/NAECON.2018.8556711. (Year: 2018).*
Shengjie et al., "Research of Image Segmentation Algorithm Based on Superpixels Clustering" (with English abstract), Xidian University, Nov. 2014, 64 pages.
PCT International Search Report and Written Opinion (with English translation) for corresponding PCT Application No. PCT/CN2021/093593, mailed Jul. 27, 2021, 11 pages.
Wang, "A Color Image Segmentation Algorithm Based on Seed Region Growing", w/ English abstract, dated May 15, 2016, 12 pages.

* cited by examiner for any two overlapped cables that are detected in the RGB image, extracting overlapped superpixels between the two cables, and determining a first depth value of the overlapped superpixels according to the depth image ~ S2101 extracting adjacent superpixels with a second preset number of superpixels from the two cables, respectively, and determining respective second depth values corresponding to the adjacent superpixels extracted from the two cables according to the depth image ~ S2102 according to the first depth value and the second depth value, calculating depth differences between the adjacent superpixels extracted from the two cables and the overlapped superpixels, respectively ~ S2103 determining the overlapping relationship between the detected cables according to the depth differences; and wherein the overlapped superpixels are assigned to the corresponding one of the two cables with a smaller depth difference, and the corresponding one of the two cables with a larger depth difference is marked as being stressed ~ S2104

FIG. 8

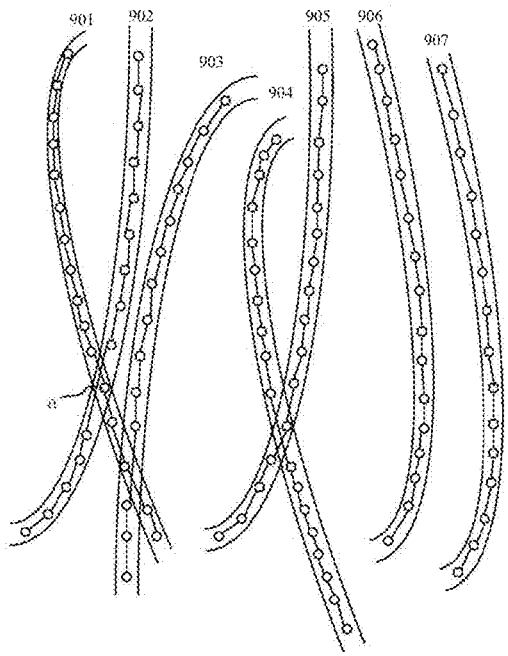

FIG. 9

CABLE DETECTION METHOD, ROBOT AND STORAGE DEVICE

CROSS-REFERENCE TO RELATED APPLICATIONS

This application is a National Stage of International Application No. PCT/CN2021/093593, filed on May 13, 2021, which claims priority to Chinese Patent Applications No. 202010413466.X filed on May 15, 2020 and Chinese Patent Applications No. 202110514942.1 filed on May 11, 2021. All of the aforementioned applications are hereby incorporated by reference in their entireties.

TECHNICAL FIELD

The present disclosure relates to the field of image processing technology, and in particular, to a cable detection method, a robot, and a storage device.

BACKGROUND

With the development of image processing technology, most of the current robots have image processing capabilities. The robot detects a cable and grabs the cable according to the detection result, saving a lot of human resources. Existing cable detection methods usually adopt cable detection based on deep learning and conventional machine learning.

However, conventional cable detection methods are only suitable for scattered cables, not stacked cables.

SUMMARY

Accordingly, it is necessary to provide a cable detection method, a cable detection device, a robot, and a device with a storage function that can be applied to the detection of stacked cables in response to the above-mentioned technical problems.

In a first aspect of the present disclosure, a cable detection method is provided. The cable detection method includes:
acquiring a RGB image and a corresponding depth image of cables:
performing image segmentation on the RGB image, and binning adjacent pixels with similar pixel features in the RGB image into superpixels;
determining target similarities between at least part of the superpixels and adjacent superpixels, and detecting the cables in the RGB image according to the target similarities between at least part of the superpixels and the adjacent superpixels;
judging whether the cables are overlapped; and
in response to detecting that the cables are overlapped, determining overlapping relationships between the detected cables according to the depth image.

In a second aspect of the present disclosure, a cable detection device is provided. The cable detection device includes:
an image acquisition module configured to acquire an RGB image of cables and a corresponding depth image;
a pixel segmentation module configured to perform image segmentation on the RGB image, and bin adjacent pixels with similar pixel features in the RGB image into superpixels;
a similarity determination module configured to determine target similarities between at least part of the superpixels and the adjacent superpixels, and detect the cables in the RGB image according to the target similarities between the at least part of the superpixels and the adjacent superpixels;
an overlapping judgment module configured to judge whether the cables are overlapped;
an overlapping relationship module configured to determine the overlapping relationships between the detected cables according to the depth image in response to detecting that the cables are overlapped.

In a third aspect of the present disclosure, a robot is provided. The robot includes a memory configured to store a computer program, and a processor. The processor is configured to execute the computer program, and implement steps of the cable detection method according to embodiments of the present disclosure.

In a fourth aspect of the present disclosure, a device with a storage function is provided. The device is configured to store a computer program. When the computer program is executed by a processor, steps of the cable detection method according to embodiments of the present disclosure are implemented.

BRIEF DESCRIPTION OF THE DRAWINGS

FIG. 8 is a schematic flowchart of steps of determining overlap relationships between cables according to a depth image according to an embodiment of the present disclosure.

FIG. 9 is a schematic view of detection results of cables according to an embodiment of the present disclosure.

DETAILED DESCRIPTION OF THE EMBODIMENTS

In order to make the objects, technical solutions and advantages of the present disclosure more clearly understood, the present disclosure be described in further detail below with reference to the accompanying drawings and embodiments. It should be understood that the specific embodiments described herein are only used to explain the present disclosure, but not to limit the present disclosure.

Figure 1:
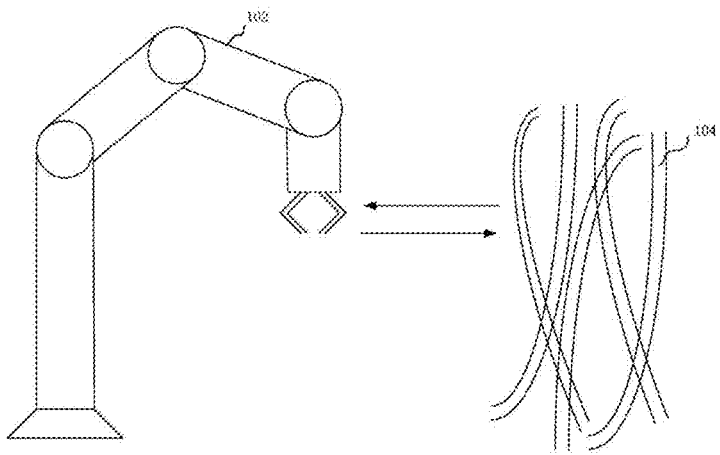
FIG. 1 is a view showing an application environment of a cable detection method according to an embodiment of the present disclosure.

A cable detection method according to the present disclosure can be applied to an application environment shown in FIG. 1. The application environment includes a robot 102 and several cables 104.

The robot includes an internal or external image acquisition device, such as a camera (not shown).

The robot 102 acquires a RGB image and a corresponding depth image of the cables 104. The robot 102 performs image segmentation on the RGB image, and bins adjacent pixels with similar pixel features in the RGB image into superpixels. The robot 102 determines target similarities between at least part of the superpixels and adjacent superpixels, and detect each of the cables 104 in the RGB image according to the target similarities between at least part of the superpixels and adjacent superpixels. The robot 102 judges whether the cables 104 are overlapped. In response to detecting that the cables 104 being overlapped, the robot 102 determines overlapping relationships between the detected cables 104 according to the depth image.

Figure 2:
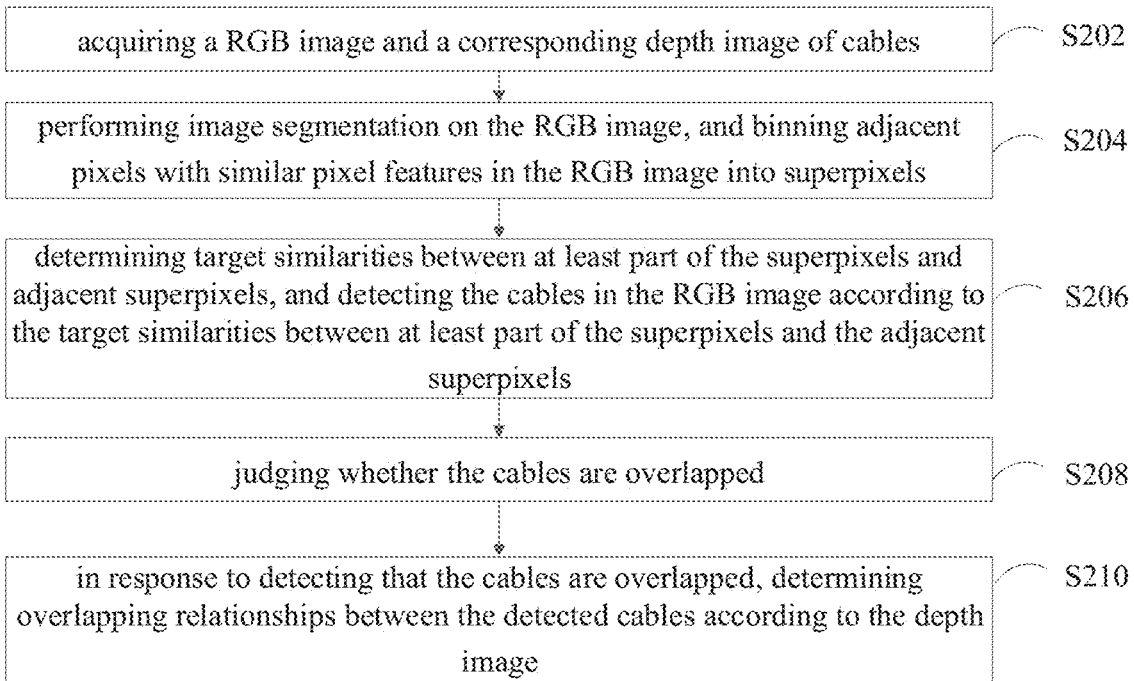
FIG. 2 is a schematic flowchart of the cable detection method according to an embodiment of the present disclosure.

In an embodiment, as shown in FIG. 2, a cable detection method is provided, and the cable detection method is applied to the robot 102 in FIG. 1 as an example for description. It can be understood that the cable detection method may not be based on the robot 102, and may be used alone or in combination with other operating devices. The cable detection method includes the following steps.

S202, a RGB image and a corresponding depth image of cables are acquired.

Specifically, the robot 102 can approach the cables 104 to be detected, and acquire the RGB image and the corresponding depth image of the cables 104 through a camera disposed on the robot 102. In some embodiments, the camera may not be directly disposed on the robot 102, and transmits the acquired RGB image to the robot 102 through a data transmission device.

In an embodiment, the RGB image corresponds to the depth image (for example, framing at the same position, etc.). The depth image and the RGB image can be acquired at the same time or separately. For example, the RGB image and corresponding depth image can be acquired simultaneously using an RGB-D camera in communication with the robot.

S204, image segmentation is performed on the RGB image, and adjacent pixels with similar pixel features in the RGB image are binned into superpixels.

The image segmentation refers to a process of subdividing an image into multiple image sub-regions, that is, a process of a collection of pixels. The superpixel refers to a small region composed of a series of adjacent pixels with similar pixel features.

In some examples, pixel features may include at least one of color, brightness, texture, or the like.

Specifically, the image segmentation includes superpixel segmentation, and the robot 102 may perform superpixel segmentation on the acquired RGB image. The robot 102 can acquire positions and pixel features of each pixel, and then the robot 102 can bin adjacent pixels with similar pixel features to obtain the superpixels.

In an embodiment, the superpixel segmentation can be implemented by the Fast-Simple Linear Iterative Clustering (Fast-SLIC) algorithm, and can also be implemented by other algorithms based on Compute Unified Device Architecture (CUDA) version of the Simple Linear Iterative Clustering (SLIC) algorithm. The algorithm used to implement the superpixel segmentation is not limited in this embodiment.

Figure 3:
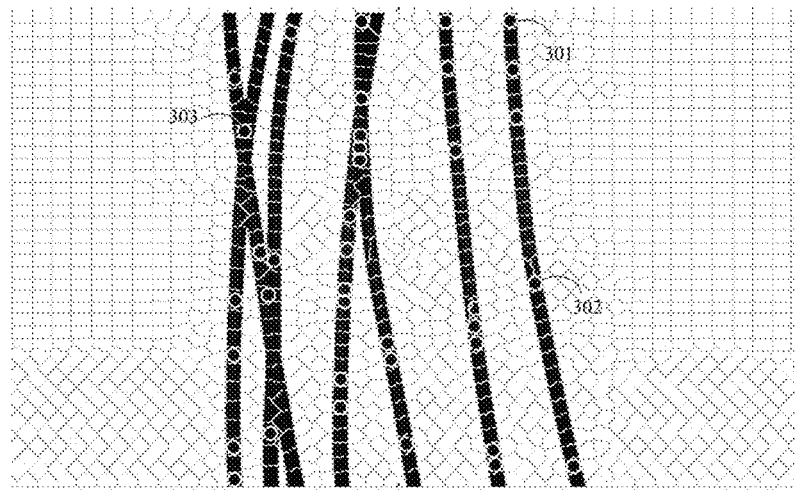
FIG. 3 is a schematic view showing multiple superpixels segmented from pixels of a RGB image according to an embodiment of the present disclosure.

FIG. 3 is a schematic view showing multiple superpixels segmented from pixels of a RGB image according to an embodiment. As shown, each grid in the figure represents a superpixel. The pixels included in each superpixel have similar pixel features (all white pixels or all black pixels) and conform to a preset superpixel shape.

S206, target similarities between at least part of the superpixels and adjacent superpixels are determined, and the cables in the RGB image are detected according to the target similarities between at least part of the superpixels and the adjacent superpixels.

At least part of the superpixels refers to a part or all of the superpixels. That is, the target similarities between a part of the superpixels and the adjacent superpixels can be determined, or the target similarities between all of the superpixels and the adjacent superpixels can also be determined. For example, the segmented superpixels can be divided into superpixels belonging to the cables and superpixels belonging to the environment. In some embodiments, the cables in the RGB image can be determined only by determining the target similarities between the superpixels belonging to the cables and the adjacent superpixels. It can be understood that, in other embodiments, the cables can also be detected by determining the target similarities between all of the superpixels and the adjacent superpixels in the RGB image.

In some embodiments, the target similarity is determined by at least one of visual similarity and direction similarity. That is, the target similarity may be determined by the visual similarity or the direction similarity, or may be determined by both the visual similarity and the direction similarity.

The visual similarity refers to similar confidence of the pixel values of the current superpixel and adjacent superpixels in their respective corresponding regions. The higher the visual similarity, the higher the possibility that the two superpixels are in the same cable. The direction similarity refers to the confidence of the current superpixel and the adjacent superpixels in an extending direction of the cable. The higher the direction similarity, the higher the possibility that the superpixel belongs to the current cable that is detecting.

In other embodiments, the target similarity may be determined according to at least one of visual similarity or direction similarity, or may also be determined according to other similarities, for example, may also be determined according to distance similarity.

Specifically, the robot 102 can acquire the target similarities between at least part of the superpixels and adjacent superpixels, and then detect each of the cables in the RGB image according to the target similarities between at least part of the superpixels and the adjacent superpixels. It can be understood that the process of sequentially determining each superpixel belonging to each cable according to the target similarities is the process of detecting each cable in the RGB image.

S208, whether the cables are overlapped is judged.

It can be understood that for cables placed together, overlapping of cables may occur. Therefore, the robot 102 can determine whether the cables are overlapped.

Specifically, in response to the robot 102 detecting the cable according to the segmented superpixels, the superpixels will be assigned to the corresponding cable. In response to the same superpixel being assigned to at least two cables, it is determined that the cables corresponding to such superpixel are overlapped.

It can be understood that in response to a superpixel being assigned to only one cable, it is determined that the cables corresponding to such superpixel are not overlapped.

S210, in response to detecting that the cables are overlapped, overlapping relationships between the detected cables are determined according to the depth image.

The overlapping relationships between the cables are used to characterize how the cables are overlapped.

In an embodiment, the overlapping relationships between the cables may include not being stressed and being stressed.

Specifically, in response to the robot detecting that the cables are overlapped, the robot can detect, according to the depth image, which one of the overlapped cables is stressed and which one is not stressed. That is, for overlapped cables, it is detected which cable is located above and which one is located below.

It can be understood that, in other embodiments, the overlapping relationships between the cables may further include at least one of specific overlapping positions and overlapping degrees between the cables.

In the above cable detection method, the acquired RGB image of the cables is image-segmented, and adjacent pixels with similar pixel features in the RGB image are binned into the superpixels. The target similarities between at least part of the superpixels and adjacent superpixels are determined, and the higher the target similarity, the greater the probability that the superpixel and the adjacent superpixel belong to the same cable. Then, the cables in the RGB image are detected according to the target similarities. It is judged whether the detected cables are overlapped. In response to monitoring that the detected cable overlaps with other cables, the overlapping relationships between the cables are detected according to the depth image. In this way, scattered cables and stacked cables can be detected accurately.

In addition, since the overlapping relationships between the overlapped cables are detected, when the cables are grasped subsequently, the cables can be accurately grasped based on the overlapping relationships. Compared with the conventional method, not only non-overlapped cables can be grasped accurately, but also overlapped cables can be grasped accurately, which improves grasping accuracy.

In an embodiment, the acquiring the RGB image of the cables in step S202 may specifically include:

acquiring an original RGB image; acquiring a HSV value of each of the pixels in the original RGB image; acquiring a mask image of the original RGB image according to the HSV value of each of the pixels; and using the mask image to convert the original RGB image to the RGB image.

The HSV (Hue Saturation Value) value may be color information represented based on the HSV color space. The mask image can be an image used to mask non-key pixels in the image.

The robot 102 can first obtain the original RGB image by capturing with the camera, and then process the original RGB image to obtain an RGB image that is easier for feature identification.

Specifically, the robot 102 can convert the color information of the pixels represented based on the RGB color space into the color information represented based on the HSV color space through a specific algorithm. That is, the RGB values of the pixels are converted into the HSV values.

The robot 102 can generate a mask image corresponding to the original RGB image according to the HSV values of the pixels. For example, according to the HSV values, pure white pixels (with a pixel value of 255) can be generated for the pixels that may belong to the cables in the RGB image, and pure black pixels can be generated for the pixels that may belong to the background. Thus, a mask image consisting of pure white pixels and pure black pixels is obtained.

A region formed by pure white pixels in the mask image is typically referred to as a mask, and the mask can roughly represent the cables in the RGB image.

The robot 102 can fuse the mask image with the original RGB image, and then convert the pure black pixels belonging to the background in the fused image into pure white pixels, to obtain a binarized cable image. The binarized cable image is the processed RGB image for superpixel segmentation.

It should be understood that the robot 102 can easily distinguish the superpixels belonging to the background and the superpixels belonging to the cables in the RGB image through the operation of converting into the binarized cable image. In response to candidate superpixels being selected according to a preset rule as described above, the robot 102 can select only the superpixels belonging to the cables accordingly.

Figure 4:
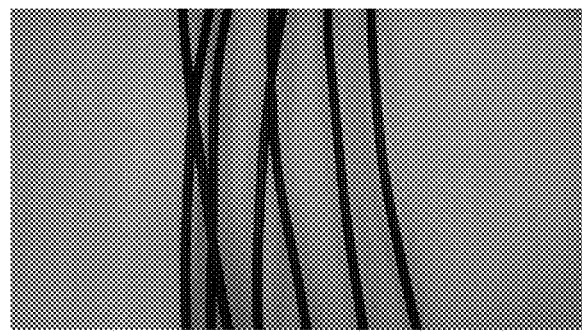
FIG. 4 is a schematic view showing an example of a RGB image of a cable.

FIG. 4 shows an example of an RGB image of cables. As shown, in the original RGB image captured by the robot 102, both the pixels of the cables and the pixels of the background have darker colors. When performing cable detection, the pixels of the background may be mistakenly identified as pixels similar to those of the cables, resulting in erroneous detection results. Therefore, the HSV value of each of the pixels in the original RGB image can be acquired first, and then the mask image can be generated according to the HSV values.

Figure 5:
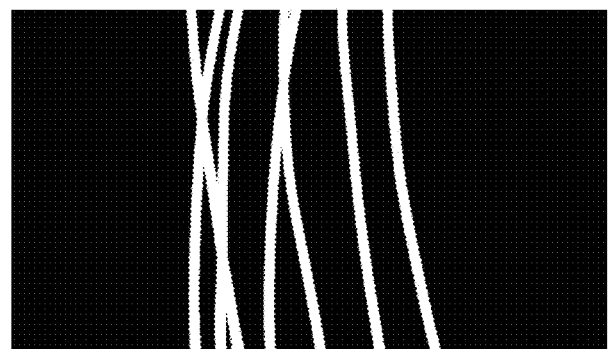
FIG. 5 is a view showing a mask image corresponding to the RGB image in FIG. 4.

FIG. 5 shows a mask image corresponding to the RGB image shown in FIG. 4. As shown, the mask in the mask image roughly matches the position and shape of the cables in the original RGB image. By fusing the mask image with the original RGB, the RGB image shown in FIG. 3 can be obtained. In order to distinguish and illustrate, the RGB image shown in FIG. 3 is named as the binarized cable image. In the binarized cable image, there is a strong contrast between the cables and the background, and it is easier to judge whether the pixels are similar, thereby improving the accuracy of cable detection.

In the above-mentioned cable detection method, by first acquiring the HSV values of the pixels in the RGB image, and then acquiring the mask image according to the HSV values, the mask image is used to obtain the binarized cable image with strong contrast between the cables and the background, as the RGB image for superpixel segmentation, which avoids mistakenly identifying the pixels of the background as cables, thereby improving the accuracy of cable detection.

In an embodiment, the binning adjacent pixels with similar pixel features in the RGB image into superpixels in step S204, specifically includes the following steps: determining the preset number of superpixels and superpixel shapes; determining positions and pixel features of pixels in the RGB image; and according to the preset number of superpixels and the superpixel shapes, binning adjacent pixels with similar pixel features into the superpixels.

Specifically, the robot 102 may determine the preset number of the superpixels and the superpixel shapes. The RGB image of the cables acquired by the robot 102 includes multiple pixels. The position of each of the pixels in the RGB image is unique, and each of the pixels includes its own pixel features. The robot 102 can bin adjacent pixels with similar pixel features into the superpixels according to the preset number of superpixels and the superpixel shapes. It can be understood that the total number of superpixels finally obtained by binning conforms to the preset number of superpixels, and the shape of the generated superpixel conforms to the preset superpixel shape.

For example, it is assumed that the preset number of superpixels is 25, and the superpixel shape is quadrilateral. Then, adjacent pixels with similar pixel features can be binned to obtain 25 quadrilateral superpixels. It should be noted that the superpixel shape being quadrilateral is illustrative only, and the superpixel shape is not necessarily limited to be quadrilateral. Specifically, the corresponding superpixel shape can be set according to actual needs, for example, can be other polygons.

In the above embodiments, by presetting the number of superpixels to be binned and the superpixel shapes, and then binning the adjacent pixels with similar pixel features according to the preset number of superpixels and the superpixel shapes, the superpixels can be obtained. In this way, the efficiency of binning superpixels is improved.

Figure 6:
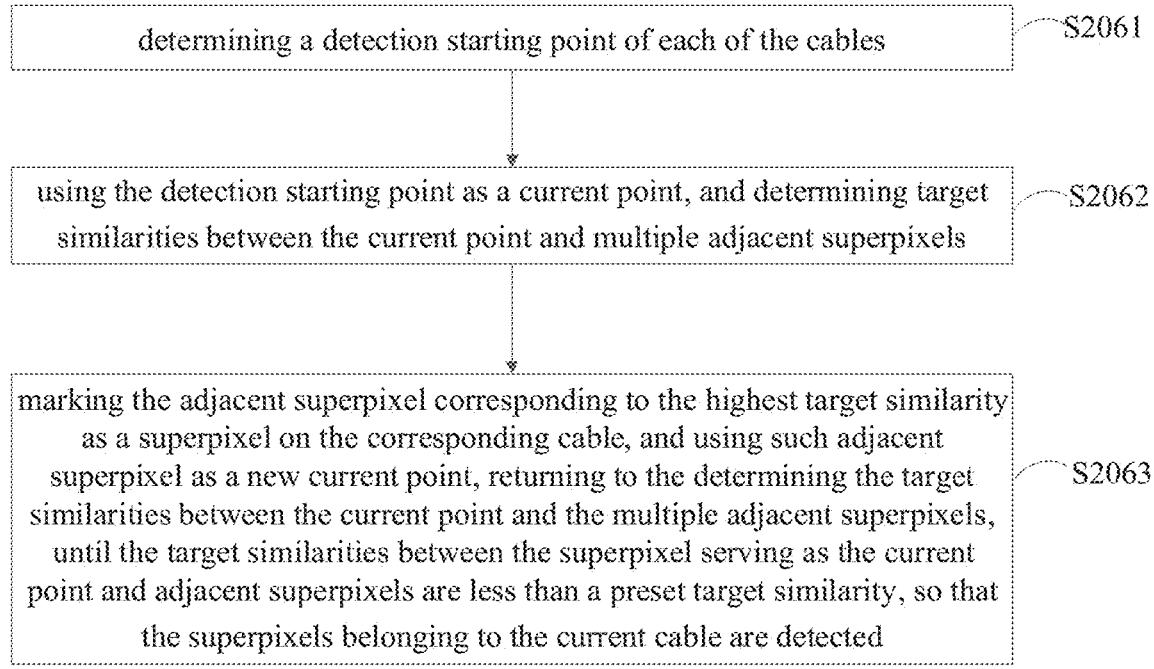
FIG. 6 is a schematic flowchart of steps of detecting each of cables according to target similarity according to an embodiment of the present disclosure.

In an embodiment, as shown in FIG. 6, step S206 may include the following steps S2061 to S2063.

At S2061, a detection starting point of each of the cables is determined.

At S2062, the detection starting point is used as a current point, and target similarities between the current point and multiple adjacent superpixels are determined.

At S2063, the adjacent superpixel corresponding to the highest target similarity is marked as a superpixel on the corresponding cable, and such adjacent superpixel is used as a new current point, returning to the step of determining the target similarities between the current point and the multiple adjacent superpixels, until the target similarities between the superpixel serving as the current point and adjacent superpixels are less than a preset target similarity, so that the superpixels belonging to the current cable are detected.

Specifically, after acquiring the RGB image of the cables, the robot 102 can determine the detection starting point of the cables in various ways. For example, endpoints of each of the cables in the RGB image can be extracted as the detection starting point.

After the detection starting point is determined, the detection starting point can be used as the current point, and the target similarities between the current point and multiple adjacent superpixels can be further determined. For each current point, there are multiple adjacent superpixels near it. The robot 102 may separately determine the target similarity between the current point and each of the adjacent superpixels. The robot 102 can sort each calculated target similarity, mark the adjacent superpixel corresponding to the highest target similarity as being located on the same cable as the current point, and continue to detect by using the adjacent superpixel corresponding to the highest target similarity as the new current point. Similarly, there are multiple adjacent superpixels near the new current point. Return to the step of determining target similarities between the current point and multiple adjacent superpixels, until the current cable is completely detected. That is, a cable corresponding to the endpoint of the cable is obtained. For example, when the target similarities between the superpixel serving as the current point and adjacent superpixels are less than the preset target similarity, it can be considered that the current cable has been completely detected.

It can be understood that the detection of cables is a cyclic and iterative process. The robot 102 marks the adjacent superpixel corresponding to the highest target similarity as the superpixel on the corresponding cables and uses such adjacent superpixel as the new current point, and then returns to the step of determining the target similarities between the current point and the multiple adjacent superpixels in S2062. The step of calculating the target similarity includes calculating the direction similarity. As such, when the direction similarities between the new current point and the multiple adjacent superpixels are calculated, the calculation may be performed by combining the previous points on the same cable that have been detected.

In an embodiment, step S2062 may specifically include: determining the visual similarities and the direction similarities between the current point and multiple adjacent second adjacent superpixels; according to the visual similarities and the direction similarities, determining the target similarities between the current point and the multiple adjacent second adjacent superpixels.

It can be understood that the target similarity between the superpixels may be determined by visual similarity and/or direction similarity. The robot 102 may determine the visual similarities and/or the direction similarities between the current point and the multiple adjacent second adjacent superpixels, respectively. Furthermore, the robot 102 may determine the target similarities between each of the current points and the multiple adjacent superpixels according to the visual similarities and/or the direction similarities.

In an embodiment, the robot 102 may obtain the target similarity according to the product (i.e., of linear multiplication) of the visual similarity and the direction similarity. It can be understood that, in other embodiments, the robot 102 may also calculate the visual similarity and the direction similarity in other ways (for example, by assigning different weights, respectively) to obtain the target similarity.

In an embodiment, a calculation formula of the target similarity is as follows:

$$\text{total confidence} = \text{visual similarity} * \text{direction similarity}.$$

where the total confidence indicates the target similarity; the visual similarity indicates the visual similarity, and the direction similarity indicates the direction similarity.

In the above embodiments, by determining the visual similarities and the direction similarities between the current point and the multiple adjacent second adjacent superpixels, to obtain the target similarities between the superpixels, the cables are detected according to the target similarities, which improves the detection accuracy of the cables.

In an embodiment, before the step of determining the target similarities between each of the current points and the multiple adjacent second adjacent superpixels according to the visual similarities and the direction similarities, the cable detection method may further include:

comparing the visual similarities between the current point and the multiple adjacent second adjacent superpixels with a preset visual similarity threshold, and using the second adjacent superpixel whose visual similarity exceeds the preset visual similarity threshold as a candidate second adjacent superpixel.

In this embodiment, the step of determining the target similarities between each of the current points and the multiple second adjacent superpixels according to the visual similarities and the direction similarities may specifically include:

determining the target similarity corresponding to each candidate second adjacent superpixel according to the visual similarity and direction similarity corresponding to the candidate second adjacent superpixel.

Specifically, the robot 102 may acquire a preset visual similarity threshold, and compare the visual similarities between the current point and the multiple adjacent second adjacent superpixels with the preset visual similarity threshold. In response to the visual similarity of the second adjacent superpixel exceeding the preset visual similarity threshold, the second adjacent superpixel is used as the next candidate second adjacent superpixel.

The robot 102 may determine the target similarity corresponding to each candidate second adjacent superpixel according to the visual similarity and direction similarity corresponding to the candidate second adjacent superpixel.

In this embodiment, only when the visual similarity between the current point and an adjacent point exceeds the preset visual similarity threshold, the adjacent point is listed as a candidate. That is, only when the adjacent point is visually similar to the current point, the final target similarity is taken into consideration, which avoids the case where some superpixels with very large visual differences (that is, being unlikely to belong to the same cable) and high direction similarities are marked as belonging to the same cable when the final target similarity is firstly considered.

Further, the robot 102 can perform step S2063 for the candidate second adjacent superpixel. That is, for the candidate second adjacent superpixel, the robot 102 can mark the second adjacent superpixel corresponding to the highest target similarity as the superpixel on the corresponding cable, and use it as the new current point.

For ease of understanding, an example is now illustrated. For example, the preset visual similarity threshold is 0.7, and there are 10 second adjacent superpixels corresponding to the current superpixel. If the visual similarities between the 4 second adjacent superpixels and the current superpixel exceed 0.7, the 4 second adjacent superpixels are used as candidate second adjacent superpixels. The visual similarity and direction similarity corresponding to the candidate second adjacent superpixel are combined to obtain the target similarity. Then, from the 4 candidate second adjacent superpixels, the second adjacent superpixel with the highest target similarity is selected, and marked as the superpixel belonging to the current cable, and is used as the next new current point for determining the target similarity between superpixels, and so on, until the current cable is completely detected.

In an embodiment, the calculation method of the visual similarities between the current point and the multiple second adjacent superpixels includes any of the following: comparing the pixel values corresponding to the superpixels in pairs to obtain the visual similarity between the superpixels; mapping the superpixels to the color space, and calculating the visual similarities between the superpixels based on the color space; acquiring a histogram corresponding to the pixel values of the pixels in the superpixel, and determining the visual similarities between the superpixels according to the similar confidence of the histogram.

Specifically, in response to calculating the visual similarity between the superpixels, the second adjacent superpixel can be compared with the corresponding pixel value in the candidate superpixel, and the above-mentioned visual similarity can be obtained according to the comparison result. A first adjacent superpixel and a candidate superpixel are mapped to a color space (for example, CIELab, CIE lab value), and then the above-mentioned visual similarity is calculated based on the color space. The CIELab is a color system, based on this color system, the color information for a certain color can be determined. Alternatively, the histogram corresponding to the pixel value of the pixel in the superpixel is acquired, and the above-mentioned visual similarity is determined according to the similar confidence of the histogram corresponding to the pixel values of the pixels in the superpixel.

In an embodiment, the visual similarity can be obtained by comparing the histograms corresponding to the pixel values of the pixels in the superpixels. S1 is used to indicate a first superpixel, S2 is used to indicate a second superpixel, and H(S1) is used to indicate a histogram corresponding to the pixel values of the pixels in the first superpixel, and H(S2) is used to indicate a histogram corresponding to the pixel values of the pixels in the second superpixel, then the visual similarity (S1, S2) can be expressed as:

$$\text{visual similarity}(S1, S2) = \Sigma \min(H(S1), H(S2))$$

By comparing pixel values, or determining the visual similarities between the superpixels based on the color space or the histogram, the method for determining the visual similarities between the superpixels is more flexible.

In an embodiment, the step of determining the direction similarities between the current point and the multiple adjacent second adjacent superpixels may specifically include:
determining a first reference direction of the current point;
acquiring a vector determined by the current point and each of the second adjacent superpixels, respectively;
according to the reference direction and the acquired vector determined by the current point and each of the second adjacent superpixels, determining the direction similarities between the current point and multiple second adjacent superpixels.

Specifically, the robot 102 may determine the first reference direction of the current point in various ways.

The corresponding vector (or direction) can be determined according to the current point and each adjacent superpixel, respectively. Therefore, the robot 102 can acquire the vector determined according to the current point and each second adjacent superpixel.

Further, the robot 102 can calculate the direction similarities between the current point and the multiple second adjacent superpixels according to the first reference direction and the vector generated based on the current point and each second adjacent superpixel.

In an embodiment, the robot 102 may import an angle between the vector generated based on the current point and each second adjacent superpixel and the reference direction into the Von Mises distribution (which is a continuous probability distribution on the circle, also known as the circular normal distribution), to calculate the direction similarity. The greater the direction similarity, the more matching the detected current point and a certain second adjacent superpixel in direction, and the more likely the detected current point and a certain second adjacent superpixel being on the same cable. The direction similarity can be expressed as:

$$\text{direction similarity }(S1, S2, rd) = \text{von Mises}(\arccos(S2(c) - S1(c), rd), k)$$

where S1 indicates the first superpixel, S2 indicates the second superpixel, rd indicates the reference direction, c indicates a coordinate value of a center point of the superpixel, S1(c) indicates a vector of the first superpixel, S2(c) indicates a vector of the second superpixel, and k indicates a parameter of the von Mises distribution. It should be understood that in other embodiments, other methods may also be used to calculate the direction similarity, which is not limited herein.

In the above embodiments, by determining the visual similarities and the direction similarities between the current point and the multiple adjacent second adjacent superpixels, to obtain the target similarities between the superpixels, the cables are detected according to the target similarities, which improves the accuracy of cable detection.

In an embodiment, the step of determining the first reference direction of the current point may specifically include:

extracting a preset number of consecutive previous points, and calculating the first reference direction corresponding to the current point according to positions of the previous points. The previous points are superpixels that have been detected and located on the same cable as the current point.

Specifically, the robot 102 can extract the preset number of consecutive previous points from the cable where the current point is located, and calculate the first reference direction corresponding to the current point according to the positions of the previous points.

In an embodiment, the robot 102 may extract a preset number of consecutive previous points from the cable where the current point is located in order from the nearest to the farthest from the current point. In other embodiments, the robot may also select a random number of consecutive previous points from the cable where the current point is located.

In an embodiment, the preset number of previous points is a first preset number of previous points or a second preset number of previous points. In the step of determining the direction similarities between the current point and the multiple adjacent second adjacent superpixels, the first preset number of previous points is firstly used as the number of preset previous points.

After detecting all the superpixels belonging to the current cable, the cable detection method may further include:
counting the number of the superpixels belonging to the current cable; in response to the number of the superpixels belonging to the current cable being less than a third preset threshold, determining that the current cable is a curved cable, and using the second preset number of previous points as the number of preset previous points, reperforming detection on the current cable; where the second preset number of the previous points is less than the first preset number of the previous points.

It can be understood that the cable subjected to image segmentation is composed of multiple superpixels, for example, one cable may include dozens of superpixels. The robot 102 may set the third preset threshold. The robot 102 may compare the detected number of superpixels included in the cable with the third preset threshold. In response to the detected number of superpixels included in the cable being greater than the third preset threshold, the robot 102 can continue to use the first preset number of previous points as the preset number of previous points, and continue to perform cable detection according to the first preset number of previous points. In response to the detected number of superpixels included in the cable being less than or equal to the third preset threshold, the robot can use the second preset number of previous points less than the first preset number of previous points as the preset number of previous points, and reperform cable detection with the second preset number of previous points.

It can be understood that in response to the detected number of superpixels included in the current cable being greater than the third preset threshold, it can be determined that the current cable is a straight cable; and in response to the detected number of superpixels included in the current cable being less than or equal to the third preset threshold, it is determined that the cable is a curved cable. In other words, different preset numbers of previous point are respectively set for the straight cable and the curved cable, that is, the first preset number of previous point set for the straight cable is greater than the second preset number of previous point set for the curved cable. In response to determining that the cable is the curved cable, the previous point is selected by changing to use the second preset number of previous points that is smaller, which can make the selected previous point more reference, so that the direction similarity can be calculated more accurately.

For ease of understanding, an example is illustrated. Assuming that the third preset threshold can be set to 10, the first preset number of previous points can be 16, and the second preset number of previous points can be 5. Then, the first preset number of previous points being 16 may be firstly used to select the previous point on the cable where the current point is located, to calculate the direction similarities. In response to the detected number of superpixels included in the current cable being 12 (i.e., greater than 10), it can be determined that the cable is the straight cable, and the robot 102 can continue to use 16 as the preset number of previous points, and continue to perform cable detection according to 16. In response to the detected number of superpixels included in the current cable being 8 (i.e., less than 10), it is determined that the cable is the curved cable. The robot 102 can use 5 as the preset number of previous points to select the previous point, to reperform cable detection.

In this embodiment, firstly assuming that the cable is the straight cable, and the first preset number of previous points is used as the preset number of previous points for detection. In response to detecting that there are fewer superpixels belonging to the current cable (i.e., the number of superpixels being less than the third preset threshold), the second preset number of previous points is reused as the preset number of previous points for detection, so as to avoid a case of missing detection of superpixels belonging to the current cable when the cable is the curved cable. In this way, both the efficiency and accuracy of detection are achieved.

It should be understood that when detecting the first several points belonging to a certain cable (for example, the endpoint of the cable serving as the detection starting point, or one or two points after the endpoint), there may be a case where the number of previous points is less than the preset number of previous points. Those skilled in the art can understand that, in some embodiments, the direction similarity may not be introduced temporarily when calculating the total target similarity, or the reference direction may be calculated using all previous points. For example, when detecting the second point of the cable, the previous point of the second point is only the detection starting point. In this case, the direction similarity may not be introduced, and only the visual similarity is used to determine the total target similarity to detect the second point. Alternatively, if the preset number is 5, when detecting the third, fourth and fifth points of the cable, only two, three and four previous points, respectively, may be used to determine the first reference direction. In addition, in other embodiments, the reference direction may be preset for the endpoint of each of the cables manually. When detecting one or several superpixels after the initial detection point, the direction similarity is firstly calculated using the preset reference direction. Then, the reference directions and the direction similarities of the subsequent superpixels are calculated according to the method in the foregoing embodiments.

In an embodiment, step S2061 may specifically include:
extracting the endpoints of the cables in the RGB image;
using the superpixel corresponding to the endpoint of each of the cables as the detection starting point of the corresponding cable.

Specifically, each of the cables includes two endpoints. After acquiring the RGB image of the cables, the robot 102 can extract the endpoints of the cables in the RGB image. The robot 102 can find out the superpixels to which the endpoints of each of the cables belong among all the binned superpixels, and use the superpixel to which the endpoint belongs as the detection starting point of the cable detection.

In an embodiment, the detection for the endpoints of the cables can be any deep learning-based target detection algorithm. For example, You Only Look Once (YOLO), Fast-Rich feature hierarchies for accurate object detection and semantic segmentation (Fast-RCNN), Fully Convolutional One-Stage Object Detection (FCOS), or Advanced Technical Staffing Solutions (ATSS), etc. The method for detecting the endpoints of the cables is not limited in this embodiment.

In the above embodiments, by determining the endpoints of each of the cables in the RGB image, and determining the superpixel to which the endpoint of each of the cables belongs, the superpixel to which the endpoint belongs is used as the detection starting point of the cable detection. The target similarities between the superpixels and the adjacent second adjacent superpixels are determined through a cyclic process, so as to obtain the cables in the RGB image according to the detected superpixels. In this way, the efficiency of the cable detection is further improved.

Figure 7:
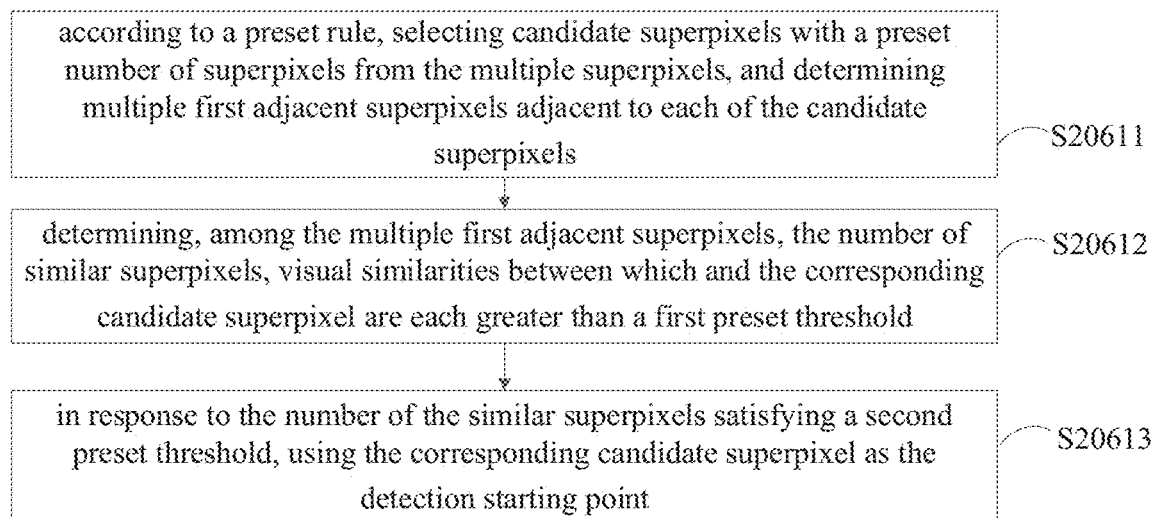
FIG. 7 is a schematic flowchart of steps of determining a detection starting point according to visual similarities between candidate superpixel and adjacent superpixels according to an embodiment of the present disclosure.

In an embodiment, as shown in FIG. 7, step S2061 may specifically include the following steps S20611 to S20613.

At S20611, according to a preset rule, candidate superpixels with a first preset number of superpixels are selected from the multiple superpixels, and the multiple first adjacent superpixels adjacent to each of the candidate superpixels are determined.

The first adjacent superpixel may be a superpixel adjacent to the candidate superpixel in the RGB image.

Specifically, the robot 102 may select the superpixels with the preset number of superpixels from the multiple superpixels according to the preset rule, as the above-mentioned candidate superpixels. The preset rule may be a random selection, or may be a selection according to the coordinates of the superpixels in the RGB image. For example, assuming that the coordinates of a center point of a superpixel in the RGB image are (x, y), in response to the horizontal axis coordinate x or vertical axis coordinate y of the center point of the superpixel being the largest/smallest among the coordinates of the center points all the superpixels, the superpixel is selected as the above-mentioned candidate superpixel. The preset number of superpixels may be set according to the situation, for example, the preset number of superpixels may be 10 or 20.

Then, the robot 102 further determines superpixels adjacent to the candidate superpixel, thereby obtaining multiple first adjacent superpixels.

As shown in FIG. 3, several superpixels are randomly selected as candidate superpixels (as shown by the circles in the figure, such as superpixels 301, 302, 303), and each of the candidate superpixels includes at least one first adjacent superpixel adjacent thereto.

At S20612, among the multiple first adjacent superpixels, the number of similar superpixels, the visual similarities between which and the corresponding candidate superpixel being greater than a first preset threshold, is determined.

The similar superpixel may be the first adjacent superpixel, the visual similarity between which and the corresponding candidate superpixel being greater than the first preset threshold.

Specifically, the robot 102 may firstly determine the similarities between the candidate superpixel and the first adjacent superpixels. Then, according to the similarities between the candidate superpixel and the first adjacent superpixels, it is determined whether the first adjacent superpixels are similar to the candidate superpixel. For example, in response to the similarities are greater than a preset similarity threshold, it may be determined that the first adjacent superpixels are similar to the candidate superpixel.

There may be various specific implementations for judging whether the first adjacent superpixel is similar to the candidate superpixel. In an embodiment, the visual similarity between the first adjacent superpixel and the candidate superpixel can be calculated first, and in response to the visual similarity being greater than the first preset threshold, it is determined that the first adjacent superpixel is similar to the candidate superpixel. The visual similarity is the similar confidence of the pixel values of the current superpixel and adjacent superpixels in their respective corresponding regions. The value of the first preset threshold may be determined according to specific applications, which is not limited herein.

Certainly, those skilled in the art can also use other ways to judge whether the whether the first adjacent superpixel is similar to the candidate superpixel according to actual needs.

Then, the robot 102 can count the number of similar superpixels for the candidate superpixels, so as to determine whether the candidate superpixels can serve as the detection starting points of the cables according to the number in subsequent processing.

At S20613, in response to the number of the similar superpixels satisfying the second preset threshold, the corresponding candidate superpixel is used as the detection starting point.

The detection start point may be an optional starting point for cable detection. The robot 102 may select at least one of the detection starting points of the cable to start cable detection.

Specifically, as shown in FIG. 3, the first adjacent superpixel that is similar to the candidate superpixel is determined to be the similar superpixel, so that the candidate superpixel 301 includes 1 similar superpixel, and the candidate superpixel 302 includes 2 similar superpixels, and the candidate superpixel 303 includes 4 similar superpixels.

Then, the robot 102 can judge whether the number of similar superpixels satisfies the second preset threshold, to determine whether a certain candidate superpixel is to be marked as the detection starting point.

In practical applications, the second preset threshold may be 2, that is, the candidate superpixel including 1 or 2 similar superpixels is marked as the detection starting point. When the candidate superpixel includes 1 similar superpixels, it means that there is a high probability that the candidate superpixel is an endpoint in the cable that is not in an overlapped region, as shown in the candidate superpixel 301 in FIG. 3. The overlapped region indicates a region of an overlapped portion of the cables that are overlapped with each other. When the candidate superpixel includes 2 similar superpixels, it means that there is a high probability that the candidate superpixel is a non-endpoint in the cable that is not in the overlapped region, as shown in the candidate superpixel 302 in FIG. 3. When the candidate superpixel includes more than 2 similar superpixels, it means that there is a high probability that the candidate superpixel is a point in the cable that is in the overlapped region, as shown in candidate superpixel 303 in FIG. 3.

It should be noted that after the inventor's in-depth research on cable detection, it is found that in response to the superpixel in the overlapped region being used as the detection starting point and then starting performing the cable detection on a certain corresponding cable, the cable detection cannot be performed normally, probably caused by the interference of the superpixels in the cable that is stressed, and even the superpixels that are similar to the detection starting point but belong to another cable are detected as the superpixels of the same cable, resulting in cable detection errors.

Therefore, in order to avoid erroneous detection results, when performing cable detection, it is necessary to avoid the superpixels in the overlapped region to start cable detection. In order to avoid the superpixels in the overlapped region, it can be judged whether a certain superpixel is within the overlapped region based on the number of adjacent and similar superpixels. In response to determining that a certain superpixel is not in the overlapped region, or in other words, is not in the region where the cables are overlapped more seriously, the certain superpixel can be used as the detection starting point, and the cable detection is performed based on the detection starting point. Certainly, those skilled in the art can adopt different quantity standards according to actual needs. For example, when there is 1 or 2 superpixels, the candidate superpixel can be determined as the detection starting point of the cable. Those skilled in the art can also set different second preset thresholds according to different definitions for superpixel, as long as it is ensured that candidate superpixels whose number of similar superpixels satisfies the second preset threshold are not in the overlapped region of the cable.

After the detection starting point is determined, the target similarities between the current superpixel and the adjacent superpixels can be detected from the detection starting point of the cable, and the superpixels belonging to the current cable in the RGB image are detected based on the target similarities between the current superpixel and the adjacent superpixels. More specifically, after the detection starting point is determined, the cable detection can be performed on the current cable from the detection starting point, to detect the superpixels belonging to the current cable in the RGB image, thereby determining the current cable. The robot 102 may firstly determine the detection starting point as the current point, then determine the visual similarities and the direction similarities between the current point and the adjacent superpixels, determine the target similarities according to the visual similarities and the direction similarities, then determine that one of the adjacent superpixels belongs to the superpixels of the current cable according to the target similarities, then use the one as the new current point, and reperform the step of determining the target similarities between the current point and the adjacent second adjacent superpixels, until the detection for the current cable is completed.

After the robot 102 has marked multiple detection starting points, one of the detection starting points of the cable can be randomly selected to perform cable detection. After the cable detection for the cable is completed, another one of the detection starting points of the other cable can be randomly selected, and perform cable detection on the other cable, until the cable detection of each of the cables in the RGB image is completed.

In the above-mentioned cable detection method, multiple first adjacent superpixels adjacent to each of the candidate superpixels are determined, and the similar superpixels similar to the candidate superpixels are determined from multiple first adjacent superpixels, and finally, in response to the number of similar superpixels satisfying the second preset threshold, the corresponding candidate superpixels is marked as the detection starting point for cable detection, and thus each of the cables is detected according to the detection starting point. In this way, the problem of low efficiency of cable detection caused by using the superpixel in the overlapped region as the detection starting point to start cable detection is avoided.

Moreover, the above-mentioned cable detection method does not require a large number of complex arithmetic processing, and can determine the detection starting point through simple pixel comparison, number counting and other processing. It is verified by experiences that, by adopting the above-mentioned cable detection method, the detection time of a single cable is about 151 ms, which significantly improves the speed of cable detection.

Furthermore, the above-mentioned cable detection method can be applied to a complex cable placement environment. Even in the complex environments such as irregular placement of multiple cables, serious overlapping between cables, etc., the detection starting point can be quickly determined based on the number of similar superpixels adjacent to a certain superpixel, and the cable detection can be performed, without manually adjusting the cables to be placed in a relatively regular form by the user, thereby saving labor and time costs for cable detection.

Further, compared with the method of determining the detection starting point by means of machine learning, the above-mentioned cable detection method can accurately determine the detection starting point without relying on a large number of learning samples, and thus the consumption of manpower and material resources are not required to produce the learning samples, saving the labor and time costs of cable detection.

In an embodiment, there are multiple detection starting points, and the using the detection starting point as the current point in step S2062 may specifically include:
 selecting at least one of the multiple detection start points as the detection start point of the current cable; and using the selected detection start point as the current point.

After the marking the adjacent superpixel corresponding to the highest target similarity as the superpixel on the corresponding cable and using such adjacent superpixel as the new current point in step S2063, the following may be further included:
 judging whether the new current point has been marked as the detection start point; if so, deleting the marking of the new current point that is the detection start point.

Specifically, the robot 102 may randomly select one or more of the multiple detection starting points as the detection starting point of the current cable. Next, the selected detection starting point is used as the current point, and the cable detection is started. In response to finding that the new current point having been marked as the detection starting point in the process of detecting the current cable, the marking as the detection starting point of the cable can be deleted, thereby avoiding the superpixels that have been detected from being repeatedly selected for cable detection in the next round of cable detection, which improves the efficiency of cable detection.

In an embodiment, step S20613 may include:
 in response to there is one or two similar superpixels, marking the corresponding candidate superpixel as the detection starting point.

Specifically, the robot 102 may mark the candidate superpixel with one or two similar superpixels as the detection starting point described above. As mentioned above, when the candidate superpixel includes 1 similar superpixel, it means that there is a high probability that the candidate superpixel is an endpoint in the cable that is not in the overlapped region. When the candidate superpixel includes 2 similar superpixels, it means that there is a high probability that the candidate superpixel is a non-endpoint in the cable that is not in the overlapped region.

It can be understood that in response to that there are multiple candidate superpixels satisfying the above conditions, multiple detection starting points can be marked and obtained.

In the above-mentioned cable detection method, by marking the candidate superpixel with one similar superpixel or with two similar superpixels as the detection starting point, the superpixel that is not in the overlapped region can be accurately used as the detection starting point of cable detection. In this way, the problem of cable detection errors caused by the cable detection starting from the superpixel in the overlapped region is avoided.

In an embodiment, after step S20613, the cable detection method may further include:
  in response to that the number of the similar superpixels corresponding to all the candidate superpixels with the first preset number of superpixels does not satisfy the second preset threshold, reselecting the candidate superpixels with the first preset number of superpixels according to the preset rule, until the candidate superpixels with the number of the corresponding similar superpixels satisfying the second preset threshold are selected, and using the selected candidate superpixel as the detection starting point.

Specifically, after counting the number of similar superpixels, the robot 102 can further judge whether the number of similar superpixels satisfies the second preset threshold; and in response to the number of similar superpixels not satisfying the second preset threshold, the robot 102 can reperform the above-mentioned step S206. That is, the robot 102 can reselect the candidate superpixels with the first preset number of superpixels from the multiple superpixels according to the preset rule, and determine the multiple first adjacent superpixels adjacent to each of the candidate superpixels, until the candidate superpixel whose number of similar superpixels satisfies the second preset threshold is selected as the detection starting point of the cable. It can be understood that the robot 102 can mark those candidate superpixels that have been selected, but includes the number of similar superpixels not satisfying the second preset threshold, thereby avoiding the repeated selection of superpixels in the subsequent process of reselecting candidate superpixels.

In the above-mentioned cable detection method, in the case where the number of similar superpixels does not satisfy the second preset threshold, the candidate superpixels are reselected according to the preset rule until the detection starting point of the cable is determined, thereby avoiding the problem that the cable detection cannot be performed due to being unable to determine the detection starting point of cable.

In an embodiment, the step of determining the first reference direction of the current point may specifically include:
  determining the first reference direction according to the current point and the detection starting point;

After detecting all the superpixels belonging to the current cable, the cable detection method further includes:
  counting the number of the superpixels belonging to the current cable; in response to the number of the superpixels belonging to the current cable being less than a fourth preset threshold, determining that the current cable is a curved cable, and redetecting the current cable according to a detection strategy corresponding to the curved cable.

It should be noted that the placed cables may be straight cables or curved cables. When determining the first reference direction for detecting the current point, it may be assumed that the current cable is the straight cable, and the detection strategy corresponding to the straight cable is used to detect the current cable.

In the detection strategy corresponding to the straight cable, the above-mentioned first reference direction may be determined according to a center point of the detection start point and a center point of the current point. For example, assuming that the center point of the detection start point is C1, when the cable is the straight cable, the above-mentioned first reference direction is obtained according to the center point C1 of the detection start point and the center point C2 of the current point. According to the first reference direction, the direction similarity can be further determined, and the target similarity can be determined according to the direction similarity and the visual similarity.

It should be noted that, in response to the current point being the detection starting point or the first several superpixels of the detected cable, the direction similarity may not be introduced, and the target similarity may be determined only by the visual similarity. Alternatively, in response to detecting that the current point is one of the first several superpixels of the detected cable, all previous points can be used to calculate the reference direction to obtain the direction similarity. For example, when detecting the second point of the cable, previous point of the second point is only the detection starting point. In this case, the direction similarity may not be introduced, and only the visual similarity is used to determine the total target similarity to detect the second point. Alternatively, when detecting the third, fourth and fifth points of the cable, only two, three and four previous points, respectively, may be used to determine the reference direction.

It can be understood that the cable subjected to image segmentation is composed of multiple superpixels, for example, one cable may include dozens of superpixels. The robot 102 may set the fourth preset threshold. After the current cable is detected, the robot 102 may compare the detected number of superpixels included in the current cable with the fourth preset threshold. In response to the number of superpixels included in the current cable is greater than the fourth preset threshold, it can be determined that the current cable is the straight cable. In response to the number of superpixels included in the current cable is less than or equal to the fourth preset threshold, it is determined that the current cable is the curved cable.

When it is determined that the current cable is the curved cable, the detection strategy corresponding to the curved cable can be used to redetect the current cable.

In the above cable detection method, by firstly assuming that the current cable is the straight cable, the detection strategy corresponding to the straight cable is used to detect the cable, and after the cable detection is completed, whether the current cable is the straight cable or the curved cable can be determined according to the detected number of the multiple superpixels belonging to the current cable. In response to determining that the current cable is the curved cable, the detection strategy corresponding to the curved cable is used to redetect the cable to correct the cable detection results, so as to improve the detection accuracy of the cable, and ensure the efficiency of the cable detection.

In an embodiment, the step of redetecting the current cable according to the detection strategy corresponding to the curved cable may specifically include:

starting with the adjacent superpixel whose visual similarity is closest to the visual similarity of the detection starting point as the current point, determining a second reference direction according to the current point and one or more consecutive previous points adjacent to the current point, and determining the direction similarities and the target similarities between the current point and the multiple second adjacent superpixels according to the second reference direction, where the previous point is the superpixel that has been detected and is located on the same cable as the current point; determining the second adjacent superpixel belonging to the current cable according to the target similarities between the current point and the multiple adjacent second adjacent superpixels, and using the second adjacent superpixel belonging to the current cable as a new current point, until the superpixels belonging to the current cable are detected.

In the detection strategy corresponding to the curved cable, the above-mentioned second reference direction may be determined according to the center point of the previous point and the center point of the current point. For example, assuming that the center points of multiple consecutive previous points continuous of the current point are C3, C4, and C5, respectively, the above-mentioned second reference direction can be obtained according to the center points C3, C4, and C5 and the center point C2 of the current point.

It should be noted that the number of selected previous points may refer to the foregoing embodiments. For example, since the current cable has been determined to be the curved cable, previous points of the second preset number of previous points may be selected.

According to the second reference direction, a new direction similarity can be further obtained. A new target similarity can be determined according to the new direction similarity. A new point of the cable can be determined from the multiple second adjacent superpixels according to the new target similarity, to finally obtain multiple superpixels belonging to the current cable after redetection.

In the above-mentioned cable detection method, the cable is determined to be the straight cable or the curved cable according to the number of superpixels in the cable, and then different reference direction determination methods are used for the straight cable or the curved cable. For the straight cables, the detection starting point and the current point are used to determine the reference direction; and for the curved cables, the current point and the previous points adjacent to the current point are used to determine the reference direction, so that targeted calculation methods for the reference directions can be used for the cables with different placement shapes, so as to obtain the more accurate second reference direction, and to calculate the direction similarity based on the more accurate second reference direction, thereby improving the accuracy of cable detection.

Further, when it is determined that the current cable is the curved cable, the reference direction is redetermined according to the current point and multiple consecutive previous points adjacent to the current point, and the direction similarity is determined based on the redetermined reference direction, so that the final target similarity is more accurate. Therefore, the detection accuracy for curved cables is improved.

In an embodiment, as shown in FIG. 8, step S210 may include the following steps S2101 to S2104.

At S2101, for any two overlapped cables that are detected in the RGB image, overlapped superpixels between the two cables are extracted, and a first depth value of the overlapped superpixels is determined according to the depth image.

Specifically, for any two overlapped cables that are detected in the RGB image, the robot 102 may extract the overlapped superpixels between the two cables, and determine the first depth value of the overlapped superpixels according to the acquired depth image.

In an embodiment, the first depth value is an average depth value within a preset window range centered on the center points of the overlapped superpixels. For example, the size of the preset window may be 3*3 or 5*5, etc.

At S2102, adjacent superpixels with a second preset number of superpixels are extracted from the two cables, respectively, and respective second depth values corresponding to the adjacent superpixels extracted from the two cables are determined according to the depth image.

In some embodiments, the adjacent superpixels extracted from the two cables are located on the same side with respect to the overlapped superpixels. The adjacent superpixels extracted from different cables are in a one-to-one correspondence relationship, and a distance between the overlapped superpixels is the same as a distance between the corresponding adjacent superpixels (e.g., the number of superpixels at intervals is consistent).

The robot 102 can extract the adjacent superpixels with the second preset number of superpixels from the two cables, respectively, so as to ensure the accuracy of the overlapping relationships in the final detection. The robot 102 determines the respective second depth values corresponding to the adjacent superpixels extracted from the two cables according to the depth image.

In some embodiments, the second depth value is an average depth value within a preset window range centered on the center point of the corresponding superpixel. For example, the size of the preset window may be 3*3 or 5*5, etc.

At S2103, according to the first depth value and the second depth value, depth differences between the adjacent superpixels extracted from the two cables and the overlapped superpixels are calculated, respectively.

Specifically, for the two overlapped cables, the robot 102 can calculate the first depth value corresponding to the overlapped superpixels, a difference between the first depth value and the second depth value corresponding to the adjacent superpixel on each of the cables, so as to obtain the depth difference between the adjacent superpixels extracted from the two cables and the overlapped superpixels.

It can be understood that, the depth difference is a positive value. When the difference between the first depth value and the second depth value is a negative value, an absolute value can be taken to obtain the corresponding depth difference.

At S2104, the overlapping relationship between the detected cables is determined according to the depth differences. The overlapped superpixels are assigned to the corresponding one of the two cables with the smaller depth difference, and the corresponding one of the two cables with the larger depth difference is marked as being stressed.

Specifically, the robot 102 can assign the overlapped superpixels to the corresponding one of the two cables with the smaller depth difference, mark the assigned cable as not being stressed, and mark the corresponding one of the two cables with the larger depth difference as being stressed, so as to obtain the overlapping relationship between the two cables. It can be understood that after determining the overlapping relationship between the cables, it is convenient for the robot 102 to grab the cables.

For example, the robot 102 may determine the adjacent superpixels that have a smaller depth difference than that of corresponding adjacent superpixel in the other cable. Further, the robot 102 can count the number of adjacent superpixels with a smaller depth difference, and determine that the cable with a larger number is not stressed, and the other cable is stressed.

For example, the depth value of the overlapped superpixels is 100, and 5 adjacent superpixels on the same side of the overlapped superpixels of the two cables are taken into account. Assuming that the absolute depth differences between the 5 superpixels of the first cable and the overlapped superpixels are [4, 6, 10, 15, 18]. The absolute depth difference between the 5 superpixels of the second cable and the overlapped superpixels are [8, 9, 11, 15, 16]. The first cable has 3 superpixels that are closer to the overlapped superpixels than the second cable (i.e., 4<8, 6<9, 10<11), so it is determined that the first cable is not stressed, and the second cable is stressed.

In the above embodiments, the depth values corresponding to the overlapped superpixels and the depth values of the adjacent superpixels can be calculated respectively through the depth image. The overlapping relationship between the cables can be determined according to the depth difference. In this way, it is convenient to control the robot to grab the cables according to the overlapping relationship, thereby improving the grabbing efficiency.

In an embodiment, the second preset number of superpixels is an odd number (1, 3, 5 or 7). Step S2104, that is, the step of determining the overlapping relationship between the detected cables according to the depth differences, is performed, including:

for each of the two cables, determining the number of adjacent superpixels with a smaller depth difference than that of the corresponding adjacent superpixel in the other cable; and determining the cable with the larger number to be not stressed and the other cable to be stressed.

Since the second preset number of superpixels is an odd number, it is inevitable that the number of the superpixels in one cable with the corresponding adjacent superpixels having a smaller depth difference is different from that of the other cable, which avoids the case where the detection result cannot be obtained.

In an embodiment, as shown in FIG. 9, there are cables numbered 901-907. FIG. 9 is a judging result of determining the overlapping relationships between the cables according to the information of the depth image. The detection results of the cables can be represented by a dot-and-line. It can be understood that when one cable overlaps another cable, and the overlapped portions of the cables are connected by straight lines, rather than the dot-and-lines. When the straight lines are used for connection, it means that this cable is below and stressed. When the dot-and-lines are used for connection, it means that this cable is above and not stressed. For example, for the cable 901 and the cable 902 in FIG. 9, the superpixel a that is overlapped belongs to the cable 901, which means that the cable 901 is above and not stressed, and the cable 902 is below and stressed. This embodiment only schematically illustrates the overlapping relationships of the cables, and the overlapping relationships of the cables is not limited thereto.

In an embodiment, the cable detection method further includes:
determining grabbing positions and grabbing directions corresponding to the cables that are not stressed according to the overlapping relationships between the cables, and grabbing the cables that are not stressed according to the grabbing positions and the grabbing directions.

Specifically, for overlapped cables, after determining the overlapping relationships between the cables, the robot can determine the grasping positions and the grasping directions corresponding to the cables that are not stressed, and grab the cables that are not stressed according to the grasping positions and the grasping directions. It can be understood that by firstly grabbing the cable that is not stressed, namely, the cable that is above, the cables can be grabbed in sequence, so as to avoid grabbing the cables irregularly to cause the cables to be entangled with each other and result in difficulty in grabbing.

In an embodiment, when the cables detected by the robot are not overlapped, the robot can directly grab the cables that are not overlapped.

In the above embodiments, the grasping position and the grasping direction of the robot are adjusted according to the detection result, and the cables to be grasped are grasped according to the adjusted pose. In this way, the grasping efficiency of the robot for the cables can be improved.

In an embodiment, after the cable detection operation is completed, the robot 102 may grab the cables according to the detection results of the cables. In an embodiment, the method for the robot 102 to grab cables may specifically include:

in response to that there is a first-priority-grabbing cable that does not have an overlapping relationship with other cables, grabbing the first-priority-grabbing cable; in response to there is no first-priority-grabbing cable, judging whether there is a second-priority-grabbing cable, where a stressing ratio of the second-priority-grabbing cable stressing other cables is lower than a preset ratio threshold and is not stressed; and in response to there is a second-priority-grabbing cable, grabbing the second-priority-grabbing cable.

Specifically, after determining the overlapping relationships between the cables, the robot 102 may use the cable that does not have overlapping relationship with other cables, that is, neither stressing other cables nor being stressed by other cables, as the above-mentioned first-priority-grabbing cable, and determine the corresponding grabbing position and grabbing direction of the first-priority-grabbing cable, and grab the first-priority-grabbing cable according to the determined grabbing position and grabbing direction.

It should be noted that, in an actual cable detection scenario, the cables are crisscrossed, and are placed relatively complex and irregular. After in-depth research, the inventor found that in the actual situation where the placement situation is relatively complex and irregular, in response to preferentially grabbing the first-priority-grabbing cable that does not have an overlapping relationship with other cables (that is, the scattered cables), in the process of grabbing the first-priority-grabbing cable, there is usually a high probability that other cables that are stressed mutually will be dragged, so that the stressed cable will change in placement shape, or will be moved in position relative to the stressing/stressed cables, whereby the cable no longer stresses other cables, or is no longer stressed by other cables, thereby facilitating cable detection. In addition, there is also a situation where the cable is longer and the capturing field of view is limited, so that the cable cannot be determined to be stressed by other cables in the captured RGB image, but during taking the longer cable as the first-priority-grabbing cable for grabbing, by the upward pulling force during grabbing, the cable that is out of the capturing field of view and stresses the first-priority-grabbing cable can be dragged, so that the cable can be released from being stressed.

In response to determining that there is no first-priority-grabbing cable currently, the robot 102 can further determine whether there is a second-priority-grabbing cable. Specifically, the robot 102 may take the cables whose stressing ratio of stressing other cables is lower than the preset ratio threshold and which are not stressed by other cables as the above-mentioned second-priority-grabbing cables. More specifically, after it is determined that there is an overlapping relationship between the cables, it may be further determined whether the overlapping relationship between the cables is stressing or being stressed. Then, the cables whose stressing ratio of stressing other cables is lower than the ratio threshold and which are not stressed are taken as the second-priority-grabbing cables. Next, the corresponding grabbing positions and grabbing directions of the second-priority-grabbing cables are determined, and the second-priority-grabbing cables are grabbed according to the determined grabbing positions and grabbing directions.

In the above-mentioned cable detection method, the cable that does not have an overlapping relationship with other cables is taken as the first-priority-grabbing cable for preferential grabbing, the placement shapes and/or placement positions of other cables can be affected in the process of grabbing the first-priority-grabbing cable, so that other cables can be released from the overlapping relationship, without no longer stressing other cables or being stressed by other cables, which is convenient for subsequent cable detection and improves the efficiency of the cable detection.

Moreover, in response to not detecting the first-priority-grabbing cable, the cable whose stressing ratio of stressing other cables is lower than the ratio threshold and which is not stressed is further determined to be the second-priority-grabbing cable, and then the second-priority-grabbing cable is grabbed. Therefore, it facilitates grabbing the cables which are not stressed by other cables and whose stressing degree of stressing other cables is not serious.

It should be understood that although the steps in FIG. 2 and FIG. 6 to FIG. 8 are shown in order, these steps are not necessarily performed in order. Unless explicitly stated herein, the performing of these steps is not strictly limited to the order, and these steps may be performed in other orders. Moreover, at least part of the above steps in the FIG. 2 and FIG. 6 to FIG. 8 may include multiple sub-steps or multiple stages. These sub-steps or stages are not necessarily performed at the same time, but may be performed at different times. The order of performing these sub-steps or stages is also not necessarily sequential, but may be performed alternately or in turn with other steps or at least part of the sub-steps or stages of other steps.

Figure 10:
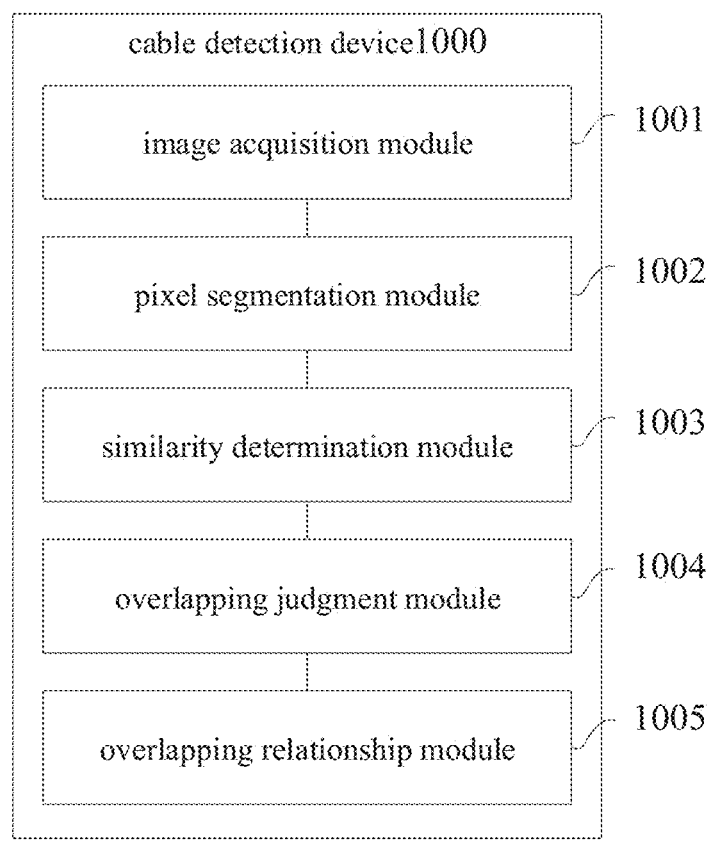
FIG. 10 is a block view of a cable detection device according to an embodiment of the present disclosure.

In an embodiment, as shown in FIG. 10, a cable detection device 1000 is provided, including: an image acquisition module 1001, a pixel segmentation module 1002, a similarity determination module 1003, an overlapping judgment module 1004, and an overlapping relationship module 1005.

The image acquisition module 1001 is configured to acquire an RGB image of cables and a corresponding depth image.

The pixel segmentation module 1002 is configured to perform image segmentation on the RGB image, and bin adjacent pixels with similar pixel features in the RGB image into superpixels.

The similarity determination module 1003 is configured to determine target similarities between at least part of the superpixels and the adjacent superpixels, and detect the cables in the RGB image according to the target similarities between the at least part of the superpixels and the adjacent superpixels.

The overlapping judgment module 1004 is configured to judge whether the cables are overlapped.

The overlapping relationship module 1005 is configured to determine the overlapping relationships between the detected cables according to the depth image in response to detecting that the cables are overlapped.

In an embodiment, the pixel segmentation module 1002 is specifically configured to: determine a preset number of superpixels and superpixel shapes; determine a position and pixel features of each of the pixels in the RGB image; and bin the adjacent pixels with similar pixel features into superpixels according to the preset number of superpixels and the superpixel shapes.

In an embodiment, the similarity determination module 1003 is specifically configured to: determine a detection starting point of the cable; use the detection starting point as a current point, and determine target similarities between the current point and multiple adjacent superpixels; and mark the adjacent superpixel corresponding to the highest target similarity as a superpixel on the corresponding cable, and use such adjacent superpixel as a new current point, and return to the step of determining the target similarities between the current point and the multiple adjacent superpixels, until the target similarities between the superpixel serving as the current point and adjacent superpixels are less than a preset target similarity, so that the superpixels belonging to the current cable are detected.

In an embodiment, the similarity determination module 1003 is specifically configured to: according to a preset rule, select candidate superpixels with a first preset number of superpixels from the multiple superpixels, and determine the multiple first adjacent superpixels adjacent to each of the candidate superpixels; determine, among the multiple first adjacent superpixels, the number of similar superpixels, the visual similarities between which and the corresponding candidate superpixel being greater than a first preset threshold; in response to the number of the similar superpixels satisfying the second preset threshold, using the corresponding candidate superpixel as the detection starting point.

In an embodiment, the similarity determination module 1003 is specifically configured to: in response to that there is one or two similar superpixels, mark the corresponding candidate superpixel as the detection starting point.

In an embodiment, the similarity determination module 1003 is specifically configured to: in response to that the number of the similar superpixels corresponding to all the candidate superpixels with the first preset number of superpixels does not satisfy the second preset threshold, reselect the candidate superpixels with the first preset number of superpixels according to the preset rule, until the candidate superpixels with the number of the corresponding similar superpixels satisfying the second preset threshold are selected, and use the selected candidate superpixel as the detection starting point.

In an embodiment, the similarity determination module 1003 is specifically configured to:

extract endpoints of the cables in the RGB image; use the superpixel corresponding to the endpoint of each of the cables as the detection starting point of the corresponding cable.

In an embodiment, the similarity determination module 1003 is specifically configured to: determine visual similarities and direction similarities between the current point and multiple adjacent second adjacent superpixels; and according to the visual similarities and the direction similarities, determine the target similarities between the current point and the multiple adjacent second adjacent superpixels.

In an embodiment, the similarity determination module 1003 is specifically configured to: determine a first reference direction of the current point; acquire vector determined by the current point and each of the second adjacent superpixels, respectively; according to the reference direction and the acquired vector determined by the current point and each of the second adjacent superpixels, determine the direction similarities between the current point and the multiple second adjacent superpixels.

In an embodiment, the similarity determination module 1003 is specifically configured to: extract a preset number of consecutive previous points, and calculate the first reference direction corresponding to the current point according to positions of the previous points. The previous points are superpixels that have been detected and located on the same cable as the current point.

In an embodiment, the preset number of previous points is a first preset number of previous points or a second preset number of previous points. The similarity determination module 1003 is specifically configured to firstly use the first preset number of previous points as the number of preset previous points in the step of determining the direction similarities between the current point and the multiple adjacent second adjacent superpixels.

After detecting all the superpixels belonging to the current cable, the similarity determination module 1003 is further specifically configured to: count the number of the superpixels belonging to the current cable; in response to the number of the superpixels belonging to the current cable being less than a third preset threshold, determine that the current cable is a curved cable, and use the second preset number of previous points as the number of preset previous points, and reperform detection on the current cable; where the second preset number of the previous points is less than the first preset number of the previous points.

In an embodiment, the similarity determining module 1003 is specifically configured to: determine the first reference direction according to the current point and the detection starting point. After detecting all the superpixels belonging to the current cable, the similarity determination module 1003 is further specifically configured to: count the number of the superpixels belonging to the current cable; in response to the number of the superpixels belonging to the current cable being less than a fourth preset threshold, determine that the current cable is a curved cable, and redetect the current cable according to a detection strategy corresponding to the curved cable.

In an embodiment, the similarity determination module 1003 is further specifically configured to: start with the adjacent superpixel whose visual similarity is closest to the visual similarity of the detection starting point as the current point, determine a second reference direction according to the current point and one or more consecutive previous points adjacent to the current point, and determine the direction similarities and the target similarities between the current point and the multiple second adjacent superpixels according to the second reference direction, where the previous point is the superpixel that has been detected and is located on the same cable as the current point; determine the second adjacent superpixel belonging to the current cable according to the target similarities between the current point and the multiple adjacent second adjacent superpixels, and use the second adjacent superpixel belonging to the current cable as a new current point, until the superpixels belonging to the current cable are detected.

In an embodiment, the overlapping relationship module 1005 is specifically configured to: for any two overlapped cables that are detected in the RGB image, extract overlapped superpixels between the two cables, and determine a first depth value of the overlapped superpixels according to the depth image; extract adjacent superpixels with a second preset number of superpixels from the two cables, respectively, and determine respective second depth values corresponding to the adjacent superpixels extracted from the two cables according to the depth image; according to the first depth value and the second depth value, calculate depth differences between the adjacent superpixels extracted from the two cables and the overlapped superpixels, respectively; and determine the overlapping relationship between the detected cables according to the depth differences. The overlapped superpixels are assigned to the corresponding one of the two cables with the smaller depth difference, and the corresponding one of the two cables with the larger depth difference is marked as being stressed.

In an embodiment, the second preset number of superpixels is an odd number. The overlapping relationship module 1005 is specifically configured to:
for each of the two cables, determine the number of adjacent superpixels with a smaller depth difference than that of the corresponding adjacent superpixel in the other cable; and determine the cable with the larger number to be not stressed and the other cable to be stressed.

In an embodiment, the first depth value is an average depth value within a preset window range centered on the center points of the overlapped superpixels. The second depth value is an average depth value within a preset window range centered on the center point of the corresponding superpixel.

In an embodiment, the cable detection apparatus 100 further includes:
a cable grabbing module, configured to determine grabbing positions and grabbing directions corresponding to the cables that are not stressed according to the overlapping relationships between the cables, and grab the cables that are not stressed according to the grabbing positions and the grabbing directions.

In an embodiment, the image acquisition module 1001 is specifically configured to: acquire an original RGB image; acquire a HSV value of each of the pixels in the original RGB image; acquire a mask image of the original RGB image according to the HSV value of each of the pixels; and use the mask image to convert the original RGB image to the RGB image.

For the specific limitation of the cable detection device, reference may be made to the limitation of the cable detection method above, which will not be repeated herein. Each of the modules in the above-mentioned cable detection device can be implemented in whole or in part by software, hardware and combinations thereof. The above modules can be embedded in or independent of a processor in a computer device in the form of hardware, or stored in the memory in the computer device in the form of software, so that the processor can call and execute the operations corresponding to the above modules. The cable detection device as described above can be used to perform the cable detection method provided by any of the above embodiments, and has corresponding functions and beneficial effects.

Figure 11:
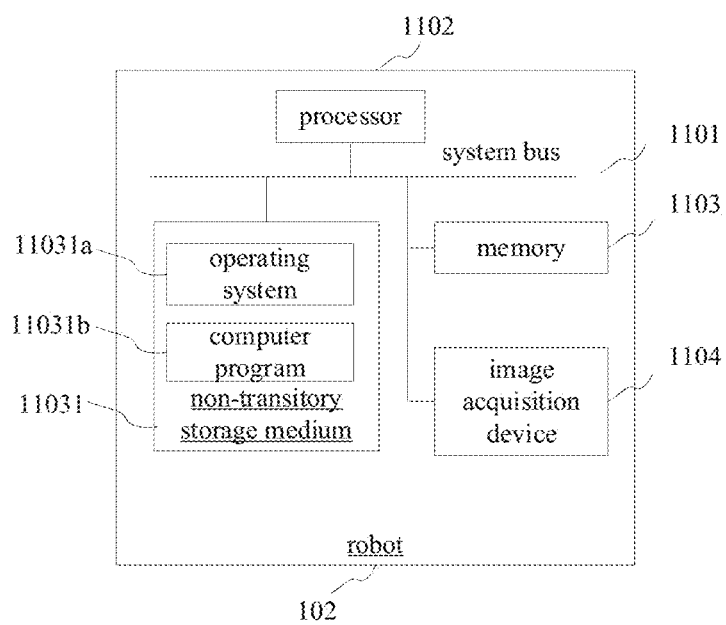
FIG. 11 is a view showing an inner configuration of a robot according to an embodiment of the present disclosure.

In an embodiment, a robot is provided, and the robot may be the robot 102 in FIG. 1, and its internal structure diagram may be as shown in FIG. 11. The robot includes a processor 1102, a memory 1103, and an image acquisition device 1104 that are connected through a system bus 1101. The processor 1102 of the robot is used to provide computing and control capabilities. The memory 1103 of the robot includes a non-transitory storage medium 11031. The non-transitory storage medium 11031 stores an operating system 11031a and a computer program 11031b. The memory 1103 provides an environment for the operation of the operating system 11031a and the computer program 11031b in the non-transitory storage medium 11031. The memory 1103 stores program instructions. The processor 1102 can execute the program instructions to perform the steps of the aforementioned cable detection method. The steps of the cable detection method herein may be the steps in the cable detection methods according to the above embodiments. The robot shown in FIG. 8 may be various types of robots, such as industrial robotic arms or humanoid robots, which are not limited herein. Those skilled in the art can understand that the structure shown in FIG. 11 is only a block diagram of a part of the structure related to the solution of the present disclosure, and does not constitute a limitation on the robot to which the solution of the present disclosure is applied. The specific robot may include more or fewer components than those shown in the figures, or in combination with some components, or have different arrangements of components than those as shown. For example, the image acquisition device 1104 and/or memory 1103 shown in FIG. 11 may be disposed inside the robot, or may be located outside the robot and connected to the processor 1102 of the robot in a communicable manner.

In an embodiment, the present disclosure further provides a device with a storage function, which stores a computer program. When the computer program is executed by a processor, the processor is caused to perform steps of the above-mentioned cable detection method. The steps of the cable detection method herein may be the steps in the cable detection methods according to the above embodiments.

Those of ordinary skill in the art can understand that all or part of the processes in the methods of the above embodiments can be implemented by instructing relevant hardware through a computer program. The computer program can be stored in a non-transitory computer-readable storage medium. When the computer program is executed, the processes of the above-mentioned method embodiments may be included. Any reference to memory, storage, database or other medium used in the various embodiments according to the present disclosure may include non-transitory and/or transitory memory. The non-transitory memory may include read only memory (ROM), programmable ROM (PROM), electrically programmable ROM (EPROM), electrically erasable programmable ROM (EEPROM), or flash memory. The transitory memory may include random access memory (RAM) or external cache memory. By way of illustration and not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), rambus direct RAM (RDRAM), direct memory bus dynamic RAM (DRDRAM), and rambus dynamic RAM (RDRAM) and so on. The technical features of the above embodiments can be combined arbitrarily. In order to make the description concise, all possible combinations of the technical features in the above embodiments are not described. However, as long as there is no contradiction in the combination of these technical features, it is considered to be fallen in the scope described in this specification. The above-mentioned embodiments only illustrate several embodiments of the present disclosure, and the descriptions thereof are specific and detailed, but they should not be construed as a limitation on the scope of the patent. It should be noted out that for those skilled in the art, without departing from the concept of the present disclosure, several modifications and improvements can be made, which all belong to the protection scope of the present disclosure. Therefore, the scope of protection of the patent of the present disclosure shall be subject to the appended claims.

What is claimed is:

1. A cable detection method, comprising:
   acquiring a RGB image and a corresponding depth image of cables;
   performing image segmentation on the RGB image, and binning adjacent pixels with similar pixel features in the RGB image into superpixels;
   determining target similarities between at least part of the superpixels and adjacent superpixels, and detecting the cables in the RGB image according to the target similarities between at least part of the superpixels and the adjacent superpixels;
   judging whether the cables are overlapped;
   in response to detecting that the cables are overlapped, determining overlapping relationships between the detected cables according to the depth image; and
   determining grabbing positions and grabbing directions corresponding to cables that are not stressed according to the overlapping relationships between the cables, and grabbing the cables that are not stressed according to the grabbing positions and the grabbing directions.

2. The cable detection method according to claim 1, wherein the binning adjacent pixels with similar pixel features in the RGB image into superpixels comprises:
   determining a preset number of superpixels and superpixel shapes;
   determining positions and pixel features of pixels in the RGB image; and
   binning adjacent pixels with similar pixel features into the superpixels according to the preset number of superpixels and the superpixel shapes.

3. The cable detection method according to claim 1, wherein the determining target similarities between at least part of the superpixels and adjacent superpixels, and detecting the cables in the RGB image according to the target similarities between at least part of the superpixels and the adjacent superpixels comprises:
   determining a detection starting point of each of the cables;
   using the detection starting point as a current point, and determining target similarities between the current point and multiple adjacent superpixels; and
   marking an adjacent superpixel corresponding to a highest target similarity as a superpixel on the corresponding cable, and using such adjacent superpixel as a new current point, returning to the determining the target similarities between the current point and the multiple adjacent superpixels, until the target similarities between the superpixel serving as the current point and adjacent superpixels are less than a preset target similarity, so that superpixels belonging to a current cable are detected.

4. The cable detection method according to claim 3, wherein the determining the detection starting point of each of the cables comprises:
selecting candidate superpixels with a first preset number of superpixels from the superpixels belonging to the current cable according to a preset rule, and determining multiple first adjacent superpixels adjacent to each of the candidate superpixels;
determining, among the multiple first adjacent superpixels, a number of similar superpixels, visual similarities between which and a corresponding candidate superpixel are each greater than a first preset threshold;
in response to the number of the similar superpixels satisfying a second preset threshold, using the corresponding candidate superpixel as the detection starting point.

5. The cable detection method according to claim 4, wherein the in response to the number of the similar superpixels satisfying the second preset threshold, using the corresponding candidate superpixel as the detection starting point, comprises:
in response to that there is one or two similar superpixels, marking the corresponding candidate superpixel as the detection starting point.

6. The cable detection method according to claim 5, further comprising, after the determining the number of similar superpixels, visual similarities between which and the corresponding candidate superpixel being greater than the first preset threshold:
in response to that the number of the similar superpixels corresponding to all the candidate superpixels with the first preset number of superpixels does not satisfy the second preset threshold, reselecting the candidate superpixels with the first preset number of superpixels according to the preset rule, until the candidate superpixels with the number of the corresponding similar superpixels satisfying the second preset threshold are selected; and using the selected candidate superpixel as the detection starting point.

7. The cable detection method according to claim 3, wherein the determining the detection starting point of each of the cables comprises:
extracting endpoints of the cables in the RGB image; and
using superpixel corresponding to the endpoint of each of the cables as the detection starting point of the corresponding cable.

8. The cable detection method according to claim 3, wherein the determining the target similarities between the current point and the multiple adjacent superpixels comprises:
determining visual similarities and direction similarities between the current point and multiple adjacent second adjacent superpixels; and
determining the target similarities between the current point and the multiple adjacent second adjacent superpixels according to the visual similarities and the direction similarities.

9. The cable detection method according to claim 8, wherein the determining the target similarities between the current point and the multiple adjacent second adjacent superpixels comprises:
determining a first reference direction of the current point;
acquiring a vector determined by the current point and each of the second adjacent superpixels, respectively;
determining the direction similarities between the current point and the multiple second adjacent superpixels according to the first reference direction and the acquired vector determined by the current point and each of the second adjacent superpixels.

10. The cable detection method according to claim 9, wherein the determining the first reference direction of the current point comprises:
extracting a preset number of consecutive previous points, and calculating the first reference direction corresponding to the current point according to positions of the previous points, wherein the previous points are superpixels that have been detected and located on the same cable as the current point.

11. The cable detection method according to claim 10, wherein the preset number of previous points is a first preset number of previous points or a second preset number of previous points, and the first preset number of previous points is firstly used as the preset number of previous points in the determining the direction similarities between the current point and the multiple adjacent second adjacent superpixels;
wherein the cable detection method further comprises, after detecting all superpixels belonging to the current cable:
counting a number of the superpixels belonging to the current cable;
in response to the number of the superpixels belonging to the current cable being less than a third preset threshold, determining that the current cable is a curved cable, and using the second preset number of previous points as the number of preset previous points, and reperforming detection on the current cable; and wherein the second preset number of the previous points is less than the first preset number of the previous points.

12. The cable detection method according to claim 9, wherein the determining the first reference direction of the current point comprises:
determining the first reference direction according to the current point and the detection starting point;
the cable detection method further comprises, after detecting all the superpixels belonging to the current cable:
counting a number of the superpixels belonging to the current cable;
in response to the number of the superpixels belonging to the current cable being less than a fourth preset threshold, determining that the current cable is a curved cable, and redetecting the current cable according to a detection strategy corresponding to the curved cable.

13. The cable detection method according to claim 12, wherein the redetecting the current cable according to the detection strategy corresponding to the curved cable comprises:
starting with the adjacent superpixel whose visual similarity is closest to the visual similarity of the detection starting point as the current point, determining a second reference direction according to the current point and one or more consecutive previous points adjacent to the current point, and determining the direction similarities and the target similarities between the current point and the multiple second adjacent superpixels according to the second reference direction, and wherein the previous point is the superpixel that has been detected and is located on the same cable as the current point; and
determining the second adjacent superpixel belonging to the current cable according to the target similarities between the current point and the multiple adjacent second adjacent superpixels, and using the second adjacent superpixel belonging to the current cable as a new current point, until the superpixels belonging to the current cable are detected.

14. The cable detection method according to claim 1, wherein the determining the overlapping relationships between the detected cables according to the depth image comprises:
   for any two overlapped cables that are detected in the RGB image, extracting overlapped superpixels between the two cables, and determining a first depth value of the overlapped superpixels according to the depth image;
   extracting adjacent superpixels with a second preset number of superpixels from the two cables, respectively, and determining respective second depth values corresponding to the adjacent superpixels extracted from the two cables according to the depth image;
   calculating depth differences between the adjacent superpixels extracted from the two cables and the overlapped superpixels, respectively, according to the first depth value and the second depth value; and
   determining the overlapping relationship between the detected cables according to the depth differences, wherein the overlapped superpixels are assigned to a corresponding one of the two cables with a smaller depth difference, and the corresponding one of the two cables with a larger depth difference is marked as being stressed.

15. The cable detection method according to claim 14, wherein the second preset number of superpixels is an odd number;
   the determining the overlapping relationship between the detected cables according to the depth differences comprises:
   for each of the two cables, determining a number of adjacent superpixels with the smaller depth difference than that of the corresponding adjacent superpixel in the other cable; and
   determining one of the two cables with a larger number of adjacent superpixels to be not stressed, and the other of the two cables to be stressed.

16. The cable detection method according to claim 14, wherein the first depth value is an average depth value within a preset window range centered on center points of the overlapped superpixels; the second depth value is an average depth value within a preset window range centered on center point of a corresponding superpixel.

17. The cable detection method according to claim 1, wherein the acquiring the RGB image of cables comprises:
   acquire an original RGB image;
   acquiring a HSV value of each of the pixels in the original RGB image;
   acquiring a mask image of the original RGB image according to the HSV value of each of the pixels; and
   using the mask image to convert the original RGB image to the RGB image.

18. A robot, comprising a processor and a memory storing a computer program, wherein the computer program, when executed by the processor causes the processor to implement the cable detection method of claim 1.

19. A device with a storage function, configured to store a computer program, wherein when the computer program is executed by a processor, the cable detection method of claim 1 is implemented.

20. A cable detection method, comprising:
   acquiring a RGB image and a corresponding depth image of cables;
   performing image segmentation on the RGB image, and binning adjacent pixels with similar pixel features in the RGB image into superpixels;
   determining target similarities between at least part of the superpixels and adjacent superpixels, and detecting the cables in the RGB image according to the target similarities between at least part of the superpixels and the adjacent superpixels;
   judging whether the cables are overlapped;
   in response to detecting that the cables are overlapped, determining overlapping relationships between the detected cables according to the depth image;
   wherein the determining the overlapping relationships between the detected cables according to the depth image comprises:
   for any two overlapped cables that are detected in the RGB image, extracting overlapped superpixels between the two cables, and determining a first depth value of the overlapped superpixels according to the depth image;
   extracting adjacent superpixels with a second preset number of superpixels from the two cables, respectively, and determining respective second depth values corresponding to the adjacent superpixels extracted from the two cables according to the depth image;
   calculating depth differences between the adjacent superpixels extracted from the two cables and the overlapped superpixels, respectively, according to the first depth value and the second depth value; and
   determining the overlapping relationship between the detected cables according to the depth differences, wherein the overlapped superpixels are assigned to a corresponding one of the two cables with a smaller depth difference, and the corresponding one of the two cables with a larger depth difference is marked as being stressed.

* * * * *